May 23, 1967     A. BARKER ET AL     3,321,379
SHEATHED FUEL PLATE ASSEMBLIES FOR A NUCLEAR REACTOR
Filed Sept. 3, 1965
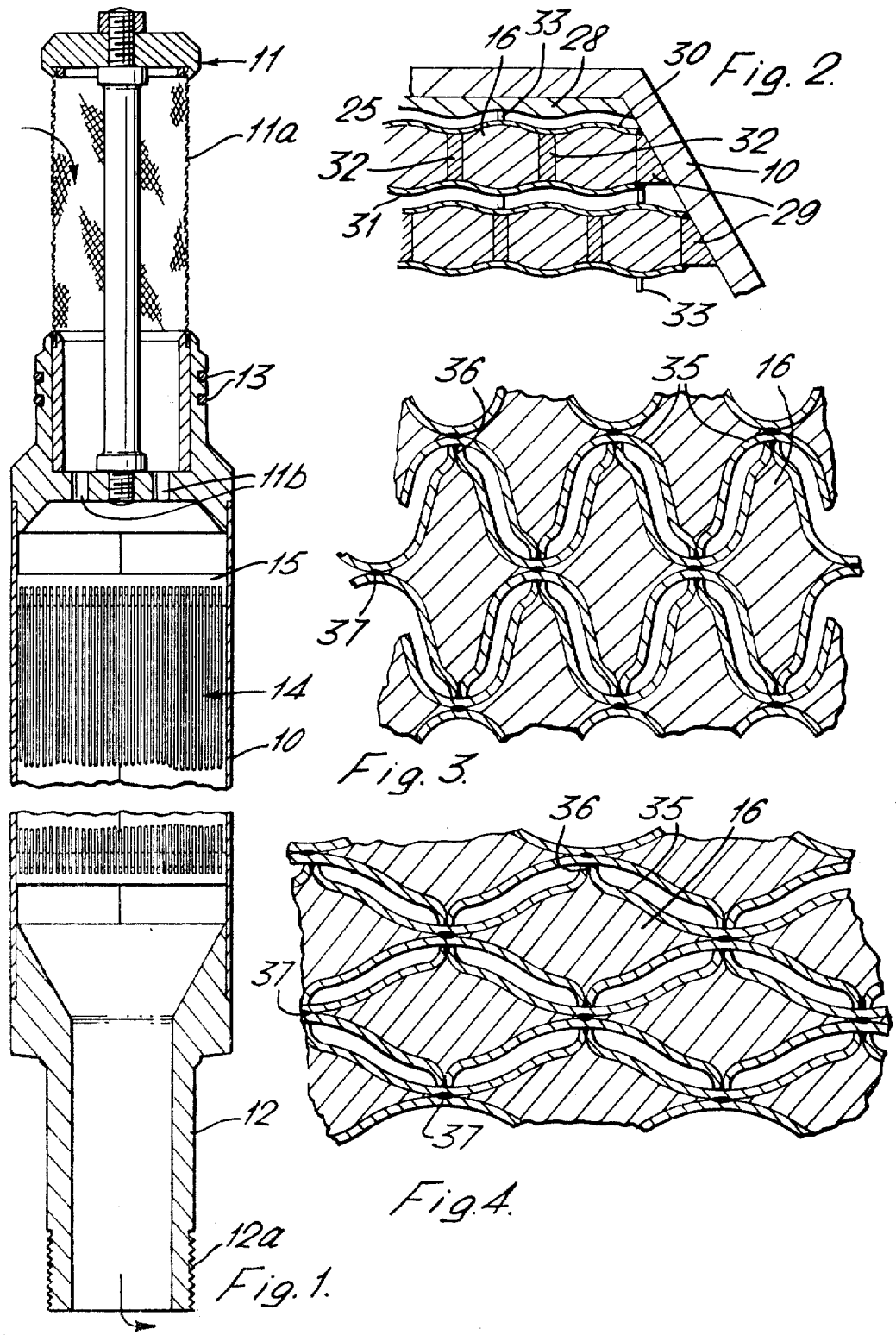

United States Patent Office 3,321,379
Patented May 23, 1967

3,321,379
SHEATHED FUEL PLATE ASSEMBLIES FOR A
NUCLEAR REACTOR
Allan Barker, Chester, and John Alan Dodd, Warrington,
England, assignors to United Kingdom Atomic Energy
Authority, London, England
Filed Sept. 3, 1965, Ser. No. 484,910
5 Claims. (Cl. 176—75)

The present invention relates to fuel element assemblies for nuclear reactors and is concerned especially with those composed of sheathed fuel plates.

In commonly owned application Ser. No. 484,963 of even date filed by Barker, Bool and Ackroyd there is described an assembly of this kind in which the fuel in each plate is in discrete masses contained in swellings in the plates, the sheathing of the plates being unitary between the swellings and the shape of the swellings in conjunction with the arrangement of the plates in the assembly being such that the swellings of adjacent plates intermesh while leaving therebetween a gap of constant width for coolant flow.

It is an object of the present invention to provide new plate constructions in furtherance of this assembly arrangement and in particular to provide plate constructions based on fabrication from corrugated sheet.

Further objects and aspects of the invention, as also advantages to be gained therefrom, will be ascertained from the following description of certain particular embodiments which are taken by way of example only and are illustrated in the accompanying drawings.

In the drawings:

FIGURE 1 is a longitudinal section of a typical fuel element assembly, the sections to either side of the centre line being respectively in mutually perpendicular planes, FIGURE 2 is a fragmentary cross section taken through the fuel-containing length of the plates in the assembly of FIGURE 1, FIGURE 3 is a view similar to that of FIGURE 2 showing an alternative construction of fuel plate, and FIGURE 4 shows, in the same manner as FIGURE 3, yet another construction of fuel plate.

As seen in FIGURE 1, the assembly has a tubular casing 10 formed of stainless steel to a hexagonal cross section. At its upper end this casing has a cylindrical top fitting including a gauze filter sleeve 11a and ports 11b allowing coolant to enter into the casing 10 from the top. At the lower end of the casing there is a hollow spike extension 12 at the end of which is a coarse threaded section 12a for securing the assembly in supporting structure of a reactor core. The assembly has been designed for use in a multi-pass reactor core cooled by supercritically pressurised aqueous coolant and in order that the coolant pass appertaining to the assembly in question may be sealed from adjacent passes there are sealing rings 13 provided in the top fitting 11 for co-operating sealingly with an upper grid structure of the reactor core.

Disposed within the casing 11 is a pack 14 of fuel plates which are interengaged so as to lie in parallel planes. The maximum thickness of these plates is so small in relation to the overall dimensions of the assembly that representation in FIGURE 1 is merely by parallel straight lines. These plates are to be understood to have six different sections of length. Starting at the upper end these sections are as follows: the upper end is solely of sheathing which has been flattened; the next section has pockets running in parallel relationship within the sheathing and in these pockets are contained discrete masses of breeder fuel such as natural or depleted uranium oxide; in the next section continuations of the pockets contain the fuel in discrete masses, the fuel being a mixture of the dioxides of uranium and plutonium; in the next section there is breeder fuel once more; in the next section the pockets are devoid of fuel to provide reservoir spaces for the accumulation of fission product gases; the last section, being the lower end, is a repeat of the upper end. location of the pack in the lengthwise direction of the casing is obtained by rack bars 15 which extend across the inside of the casing transversely of the pack at both ends. The edges of the plates are fitted into slots of these rack bars, the slots of those at the upper end of the pack having extra depth to allow for lengthwise expansion of the plates relative to the casing.

All the fuel plates of the assembly are similarly constructed, but, before describing them in detail, it should be pointed out with reference to FIGURE 2 that there is included as each of the outer components of the pack of fuel plates a packing 28 which at its side edges is a snug fit in the corners of the hexagonal casing 11, this packing being of stainless steel like the casing. Also for providing a snug fit of the plates in the casing, the plate edges are terminated by a triangular piece 29 which is a modified form of so-called bridge pieces to be described subsequently.

Referring to FIGURE 2, the fuel plate sheathing is fabricated of smoothly undulating corrugated sheets 30, 31 of uniform thickness with their concavities in registration and united indirectly by bridge pieces 32 in the form of flat strips sealingly secured, as by resistance welding, to the sheets so as to constitute a continuous partition ensuring that adjacent pockets containing straight longitudinally extending fuel masses 16 represent individual pressure vessels. Whereas the sheets are of stainless steel the bridge pieces are of a high temperatures resistant nickel alloy. In the constant width coolant gap formed between the plates (likewise between the packing 28 and the adjacent outermost plates) spacers are introduced by the attachment of upstanding thin strips 33 of stainless steel to the convexities of the plates, only every fourth convexity on each plate having such a strip in the illustrated example.

To avoid the need for attached spacers, the fabrication procedure in FIGURES 3 and 4 is such as to produce integral spacers. For this purpose the fuel plate sheathing is composed of channels 35 having a lipped bell section, the extremities of the lips being lap seam welded as by electron beam welding, so as to form projections 36 acting as spacer ribs. Seam welding, for which resistance welding is likely to be more appropriate, is used to unite directly the registered concavities of the channels, as at 37. In FIGURE 3 the plate centre line lies along a side of the triangular lattice of the fuel masses 16 whereas in FIGURE 4 this line is perpendicular to the triangle side and hence the channels 35 are very much more shallow. The shapes of the pockets formed for reception of the fuel or breeder fuel favour filling with the powder form of the material rather than the pelleted form; this may be so for a construction employing bridge pieces, as in FIGURE 2, as well as for the constructions of FIGURES 3 and 4.

We are aware of previous proposals whereby cylindrical fuel-containing pockets are joined in a side-by-side parallel relationship by uniform thickness webs to form a fuel plate but believe to be novel the features herein set forth whereby a coolant gap of constant width is obtained.

What we claim is:

1. An assembly of sheathed fuel plates for a nuclear reactor comprising plates whereof the sheathing is constituted by corrugated halves of uniform thickness sheet united at the concavities of the corrugations to form longitudinally extending pockets, a discrete mass of nuclear fuel being contained in each pocket and the convexities of the corrugations of adjacent plates being introduced to leave between the plates a gap of constant width for coolant flow.

2. An assembly as claimed in claim 1, in which the concavities are united directly by welding.

3. An assembly as claimed in claim 2, in which the halves are fabricated of separate channels joined in parallel relationship along their edges by welding.

4. An assembly as claimed in claim 3, in which the edges of the channels are in a lapping relationship and form projections acting as integral and continuous spacer ribs in engagement with concavities of adjacent plates.

5. An assembly as claimed in claim 4 wherein said spacer ribs engage the concavities of adjacent plates along the weld lines of the united concavities of the adjacent plates.

References Cited by the Examiner
UNITED STATES PATENTS

| | | | |
|---|---|---|---|
| 2,838,452 | 6/1958 | West et al. | 176—75 X |
| 2,988,495 | 6/1961 | Battle | 176—73 |
| 3,071,526 | 1/1963 | Litt | 176—76 X |
| 3,097,152 | 7/1963 | Walker | 176—75 X |
| 3,105,807 | 10/1963 | Blake | 176—81 X |

CARL D. QUARFORTH, *Primary Examiner.*

BENJAMIN R. PADGETT, *Examiner.*

M. J. SCOLNICK, *Assistant Examiner.*